Oct. 28, 1947.  T. S. LINDABURY  2,429,763
COLLAPSIBLE STROLLER
Filed April 27, 1945  4 Sheets-Sheet 1

INVENTOR.
TRYON S. LINDABURY
BY
Elmer C. Lindholt
ATTORNEY

Oct. 28, 1947.  T. S. LINDABURY  2,429,763
COLLAPSIBLE STROLLER
Filed April 27, 1945  4 Sheets-Sheet 2
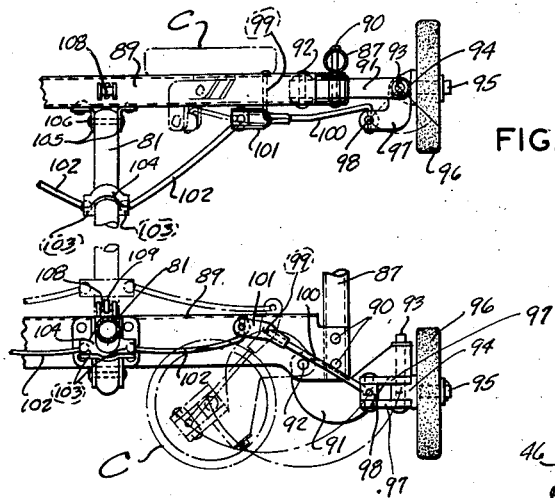
FIG.5.
FIG.4.
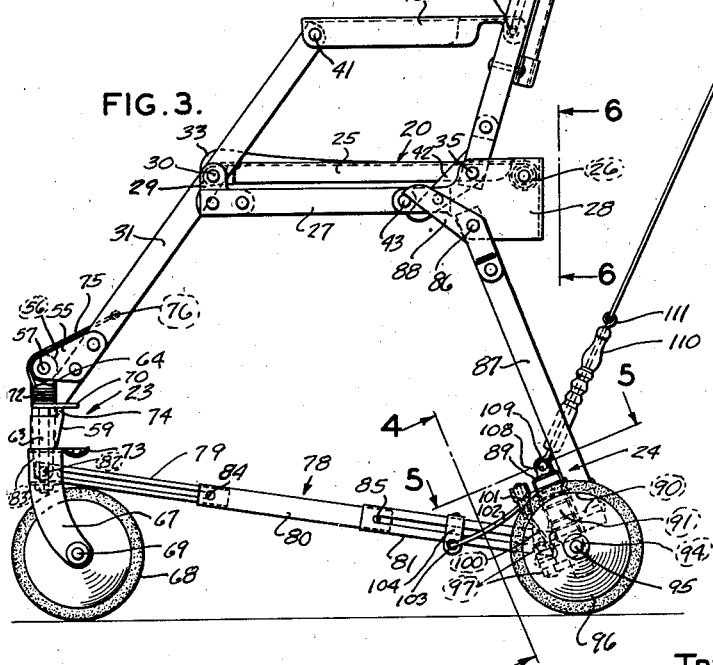
FIG.3.
FIG.6.
INVENTOR.
TRYON S. LINDABURY
BY
*Elmer C. Landholt*
ATTORNEY

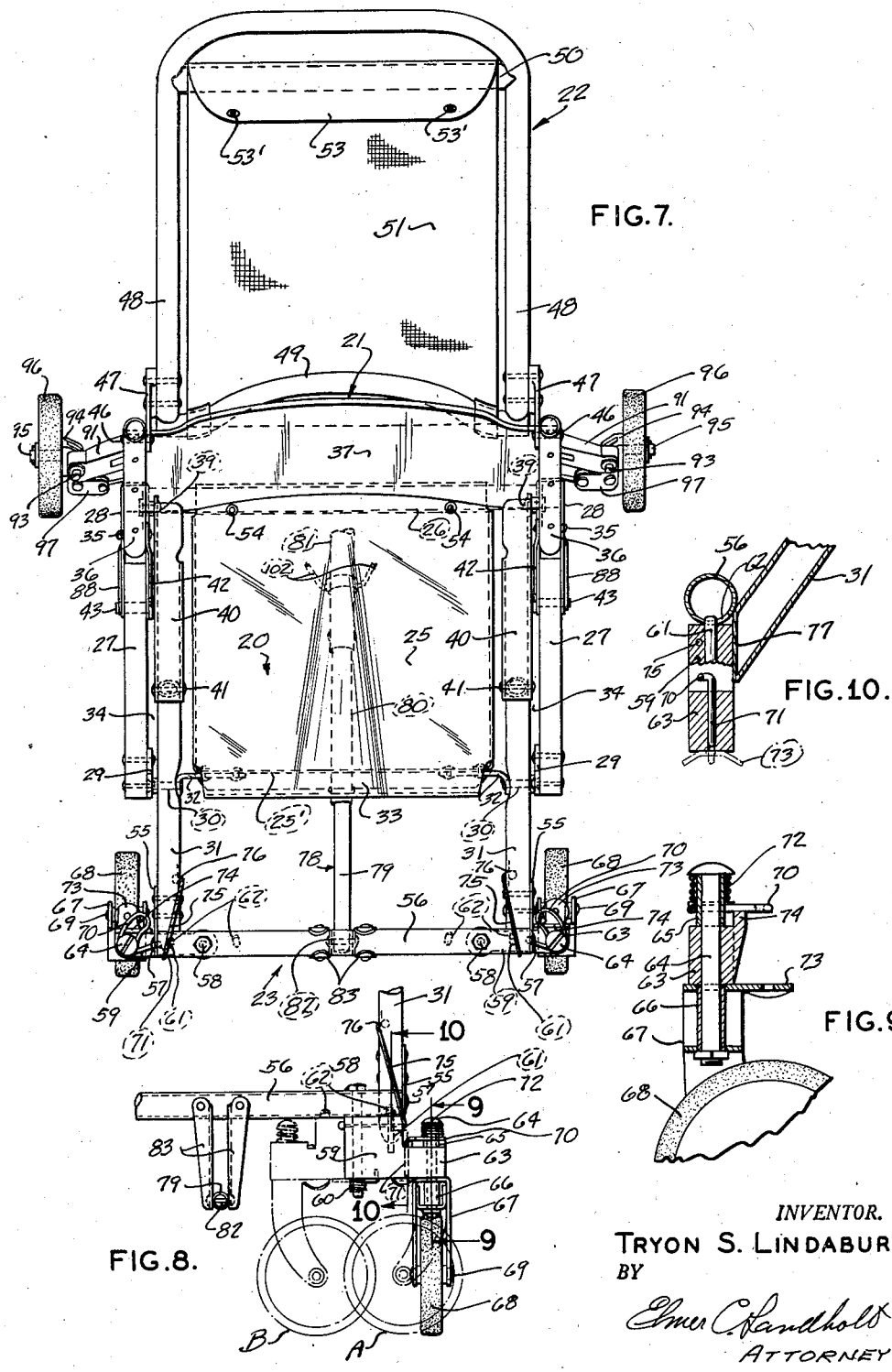

Oct. 28, 1947.                    T. S. LINDABURY                    2,429,763
                                  COLLAPSIBLE STROLLER
                                  Filed April 27, 1945              4 Sheets-Sheet 4
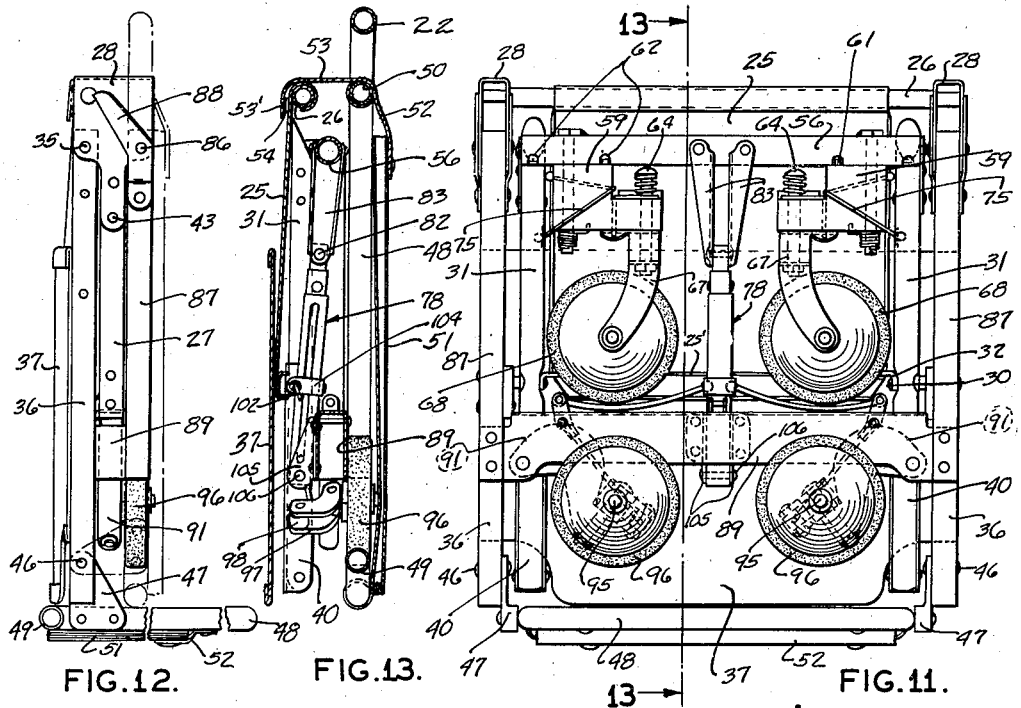
FIG.12.     FIG.13.                                    FIG.11.
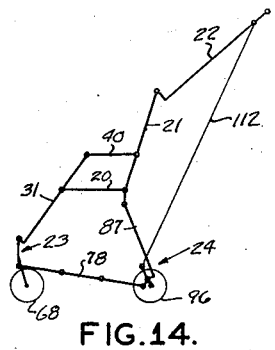    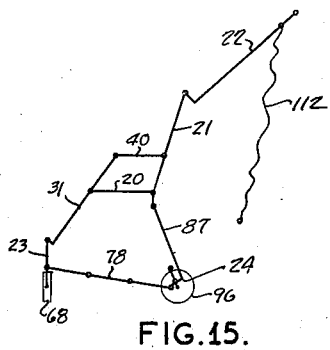    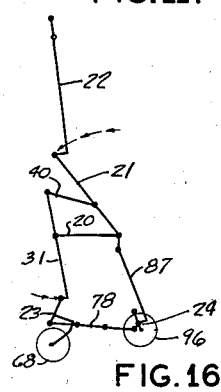
FIG.14.         FIG.15.         FIG.16.
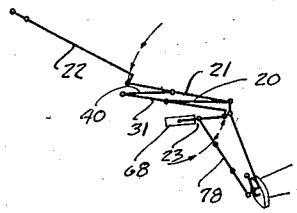    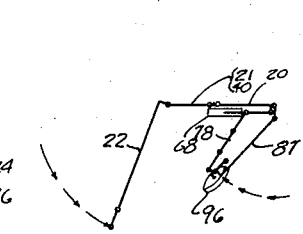    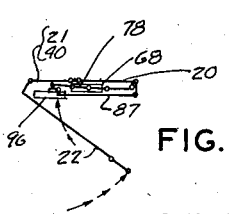
FIG.19.
FIG.17.         FIG.18.
INVENTOR.
TRYON S. LINDABURY
BY
Elmer C. Landtolt
ATTORNEY Patented Oct. 28, 1947

2,429,763

UNITED STATES PATENT OFFICE 2,429,763

COLLAPSIBLE STROLLER

Tryon S. Lindabury, St. Louis, Mo.

Application April 27, 1945, Serial No. 590,657

10 Claims. (Cl. 280—38)

This invention relates generally to children's vehicles and more particularly to that type of vehicle known as a stroller which is adapted for normal use as such, or may be folded or collapsed into a very compact unit for transportation or storage purposes.

The primary object of the invention is found in the provision of a stroller of the collapsible type which is provided with wheeled units adapted for angular movement relative to their supports during collapsing of the vehicle to bring such units into the general plane of the folded members so that the finished folded unit will be of less thickness than the normal diameter of the wheels.

A further object is attained in a wheeled vehicle which has a seat unit, a back unit and pairs of upright members to which are attached wheel supporting frames each having wheel supporting means pivoted thereto whereby, upon folding movement of the seat, back, uprights and frames, the wheel supporting means and the wheels will be caused to rotate about centers other than the normal rotating centers of the wheels to bring the wheels into position to lie in the general plane of the various members, thereby providing a relatively thin compact folded unit.

A still further object is found in a collapsible vehicle having wheel units of such lateral extent, when set up for use, to lessen the tendency of lateral tipping yet upon folding of the vehicle will not only move angularly to bring the wheels into the plane of the supporting units and other frame members but will simultaneously swing inwardly to materially reduce the overall width of the collapsed package.

A further object may be found in a collapsible vehicle having paired angularly movable wheel units which are interconnected to control and regulate the angular movement of each wheel unit so that upon collapsing of the vehicle the proper movement and final positioning will be insured.

Another object is attained in a collapsible vehicle having a pushing handle connected to the back unit which may be normally connected to the rear wheel support to assist in maintaining the vehicle in extended or useful position and having a storage or package carrying bag attached thereto, but when disconnected from the wheel support and the vehicle collapsed, the handle can be moved over the exposed mechanism and wheels to cover the same with the bag thereon and fixed in that position to maintain the vehicle in collapsed position.

Other objects and advantages of this invention will be apparent in the following detailed description and accompanying drawings (4 sheets) in which:

Fig. 3 is a side elevation of the extended vehicle;

Fig. 4 is an elevational view partly in section of the rear wheel supporting frame as viewed on line 4—4 of Fig. 3;

Fig. 5 is a plan view thereof taken on line 5—5 of Fig. 3;

Fig. 6 is an end elevation of a portion of the vehicle as viewed along line 6—6 of Fig. 3;

Fig. 7 is a plan view of the entire vehicle;

Fig. 8 is a fragmentary elevation of a portion of the forward wheel supporting structure;

Figures 1, 2:
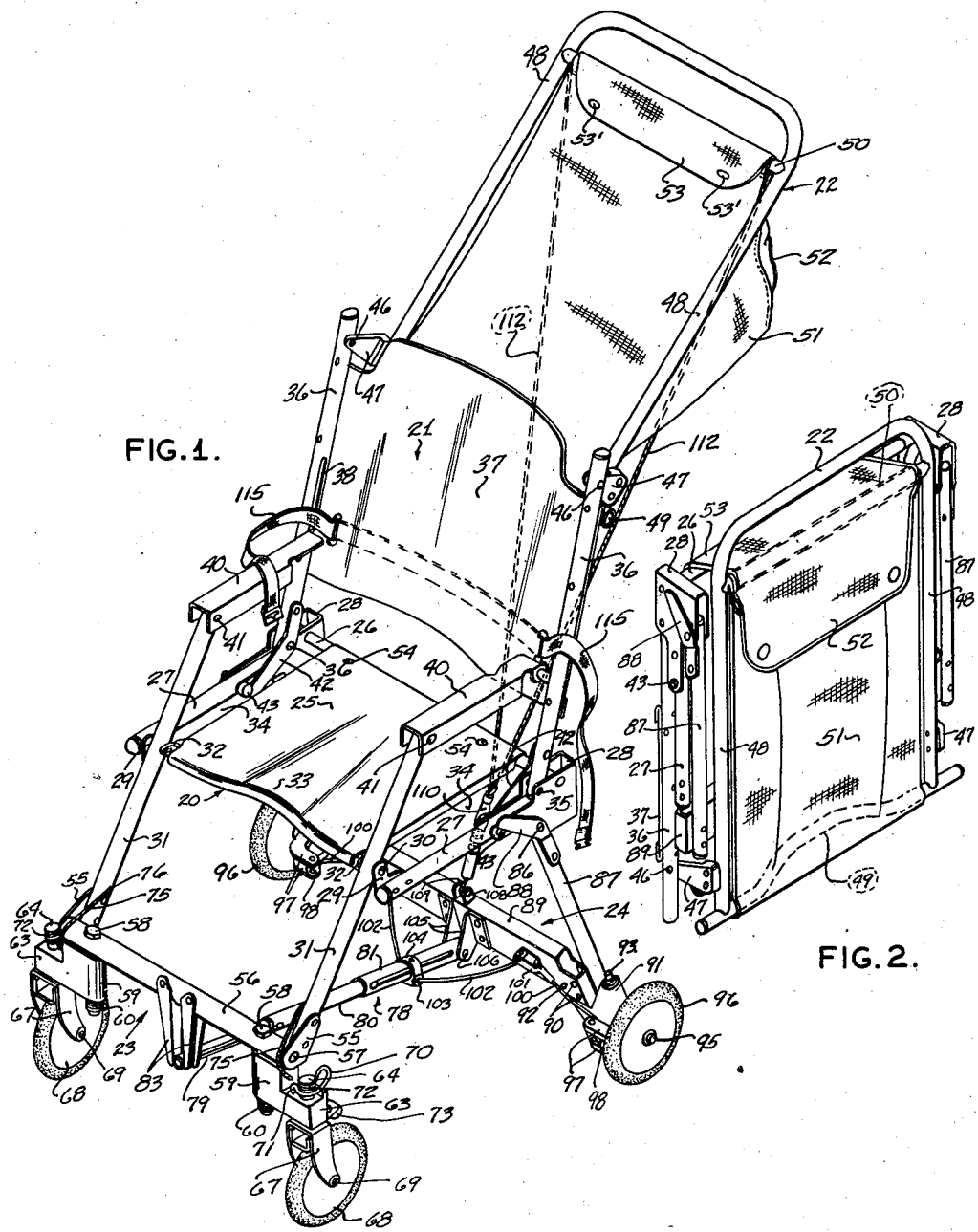
Fig. 1 is a perspective view of the vehicle of this invention shown in extended position.
Fig. 2 is a perspective view showing the vehicle in its collapsed condition.

Figs. 9 and 10 are detail sections taken on lines 9—9 and 10—10, respectively, of Fig. 8;

Fig. 11 is an elevational view of the folded vehicle with the handle cover partially open;

Fig. 12 is a side elevation thereof;

Fig. 13 is a cross section taken on line 13—13 of Fig. 11;

Figs. 14, 15, 16, 17, 18 and 19 are diagrammatic views illustrating the various stages of collapsing of the vehicle from full open to nearly full closed position.

The preferred construction of the vehicle embodying the features of this invention are shown in the drawings as comprising, generally, a seat unit 20, back unit 21, handle unit 22, forward wheel unit or assembly 23 and a rear wheel unit or assembly 24. The seat unit 20 is made up of a seat panel 25 of formed and flanged sheet metal construction suitably attached at its rear end to a transverse supporting tube 26. Spaced laterally outward from the seat panel 25 and forming part of the seat unit 20 are tubular side members 27 having secured to the rear portions thereof channel members 28 to which are fastened the ends of cross tube 26. The forward portion of side members 27 have secured thereto off-set plate members 29 in the extending portions of which are fitted pivot pins 30. Pivotally mounted intermediate its ends on the pins 30 are forward upright members 31; the inner ends of the pins being connected as by angle straps 32, to a transverse angle member 25' secured to and located near the forward end of the seat panel 25. The central and forward portion of the seat panel 25 is formed upwardly at 33 to allow space for certain portions of the mechanism upon folding or collapsing thereof as will be hereinafter described.

From the foregoing it will be seen that the seat unit 20 is fabricated of a number of component parts so constructed and related that a space 34 is provided between the seat panel and the outer members 27 for the reception of the forward upright member 31 upon collapsing of the vehicle.

Pivotally mounted within the channels 28 of the side members 27 as by pins 35 are upright side tubes 36 of the back unit 21, a curved back panel 37 being fixed to the rear face of tubes 36 to complete the back unit 21. The inner faces of side tubes 36 are provided with slots 38 for slidingly receiving pins 39 mounted in the rear portion of one flange of channel shaped arm rests 40, the forward ends of which are pivotally connected by pins 41 to the upper ends of the forward upright members 31. It will be noted by reference to Fig. 3 that the upper end of tubes 31 are extended to engage the inner face of the upper wall of channel arm 40 forming a stop to prevent further angular movement of the arm and tube. Fixed to the inner faces of side tube members 36 near the lower end thereof are stop plates 42 which are offset to overlie the channel members 28 and extend downward and forward to engage the head portion of stop pins 43 fixed in the side tubes 27 and channels 28 of the seat unit 20 to limit the rearward movement of the back unit as shown in Fig. 3.

Pivotally attached to the inner upper portion of back unit side members 36 by pins 46 are fittings or brackets 47 secured to and offset from the lower ends of a U-shaped frame member 48 of the handle unit 22. A curved cross member 49 extends across and is fixed to the lower end of the frame member 48 to form a stop for limiting the angular movement of the handle unit 22. The cross member 49 combines with an upper cross member 50 to support a pleated expansible bag 51 having a closure flap 52 and furnished to carry packages or other articles and further to cover the internal parts of the vehicle when in closed or collapsed position. An oppositely extending flap 53 is attached to the upper cross arm 50 and has snap fasteners 53' thereon which are adapted to engage mating fasteners 54 on the seat panel 25 to maintain the vehicle in its collapsed or folded position as later described.

Fixed to the forward upright members 31 near the lower ends thereof are plates 55 having forwardly projecting portions which are pivotally connected to the ends of a cross tube 56 by pins 57. Secured to and extending downwardly from tube 56 and spaced a suitable distance inwardly of each upright 31 are bolts or pins 58 which carry for swinging movement thereon, wheel mounting or supporting blocks 59. A torsion spring 60 attached at each of its free ends to the bolt 58 and block 59, respectively, urge the block to rotate rearwardly then inwardly about the bolt to complete a half revolution to a position shown in broken lines in Fig. 8. Such movement is limited by the engagement of a pin 61 on block 59 with stop slots 62 in cross tube 56. A reduced portion 63 of block 59 projects outwardly to receive a vertically positioned bolt and nut assembly 64 extending above and below the portion 63 to receive spacer elements 65 and 66. Pivotally mounted on the spacer element 66 are transverse wall portions of a fork member 67 which extends downwardly and is off-set to receive between the legs thereof, a wheel 68 rotatably mounted on a shaft 69; the off-set location of the wheel axis with respect to the vertical pivot of the fork allows a castering action of the wheel. An arcuate loop member 70 is positioned about the upper spacer 65 and has a portion which extends inwardly then downwardly through a bore in block 59 to form a locking leg 71. A compression spring 72 positioned between the loop and the head of bolt 64 urges the loop downwardly which, in one position of parts, extends the leg 71 below the lower face of block 59 in which position the lower end of the leg is free to enter the opening in a projecting portion 73 of fork 67 to lock the fork and wheel in its transverse aligned position. Upon manually lifting the loop against the force of spring 72 to disengage the fork projection and rotating same about the leg to extend the loop over a ledge 74 of block 59 the leg 71 will be removed from the path of fork projection 73 to allow free pivoting of the fork and wheel about the bolt 64 for castering movement thereof. Extending transversely through and secured to the block 59 is a cable 75 which wraps around tube 56 and upright 31 for securement to the inner face of the upright at 76 for controlling the rotative movement of the block and wheel assembly as later described. The lower end of upright 31 is angularly terminated at 77 to bear against block 59 and maintain the pin 61 in engagement with one stop slot 62 as shown in Fig. 10.

The above described parts, including the cross tube, supporting blocks and forks may be termed a forward wheel supporting assembly or unit which by action of springs 60 tend to rotate forwardly about pins 57. Such rotation of this assembly will be accomplished by pivotal movement of blocks 59 rearward and inward about bolts 58 as urged by torsion springs 60 to cause the cables 75 to wrap around these blocks. This action of blocks and cables will shorten the effective cable length between cable attachments 76 and a transverse plane through the axes of bolts 58 thus producing a pivotal movement of the assembly forward and upward relative to pivot 57 until such blocks and wheels lie in a plane parallel with the upright members 31 as shown in Fig. 11. To prevent such rotation during the extended or open position of the stroller there is provided a collapsible tension member 78 which comprises telescoping tubes 79, 80 and 81. The forward tube 79 is pivotally secured by pin 82 to the lower end of paired brackets 83 fixed to and depending from the cross tube 56 and is longitudinally slotted to receive the pin 84 at the forward end of center tube 80. The rear tube 81 is also slotted to receive a pin 85 of tube 80 and is fixed at its rear portion to the rear wheel supporting unit to be presently described.

Pivotally mounted within channels 28 of side members 27 as by pins 86 and extending rearwardly downward therefrom are rear supporting tubes 87 having stop plates 88 attached to their upper portions and overlying the channels so that the legs thereof contact the outer extremity of stop pins 43 in side tubes 27 to limit the rearward pivotal movement of the tubes or uprights 87. Fixed to the lower end of tubes 87 is a transversely positioned channel member 89 which has bent over ends for attachment to the tubes by rivets 90. Rear wheel supporting blocks 91 have one extremity pivotally attached within the channel 89 by pins 92 just inward of tubes 87 and extend outwardly therefrom to receive a vertically positioned pin 93. Pivotally mounted on the lower projecting portions of pins 93 are the hub extensions 94 of shafts or axles 95 on which are rotatively positioned rear wheels 96. Also mounted on pins 93 on either side of hubs 94 are L-shaped plates 97 which have leg portions engaging the shoulders of the hubs for movement therewith and other leg portions which pivotally receive shouldered pins 98.

Mounted above and inwardly of block pivots 92 for rotation in channel 89 are angle ends 99 of levers 100, the outer ends of which are pivotally mounted in pins 98 for universal action with the plates 97. Extending oppositely beyond the angle portions 99 of levers 100 are arms 101 to which are attached for universal movement therewith the outer ends of links 102. The opposite ends of links 102 are attached by ball joint or universal connections 103 to a fitting 104 surrounding and fixed to the rear tube 81 of the telescoping tension member 78. Angle members 105 extending forwardly and downwardly from the channel 89 are pivotally connected by pin 106 to the rear portion of tube 81. It will be seen that angular movement of the tube 81 upward and rearward will cause a shortening of the lateral distance between ball joint 103 and arms 101, thus causing an angular movement of levers 100. Such rotation of levers 100 will cause blocks 91 to be rotated inwardly and at the same time causes rotation of plates 97 and wheel shafts or axles 95 to move the wheels 96 inwardly and angularly to the position shown in broken lines in Fig. 4, and as will more clearly appear hereinafter wherein the complete operation and folding of the stroller is described in detail.

Removably attached to a pin 108 fixed in suitable upstanding ears on channel 89 is a hook end 109 of a handle grip 110 to the opposite loop end 111 of which is fastened the lower end of a V-shaped cable 112. The upper ends of the cable are secured to the cross tube 50 of handle 22 outwardly of bag 51. This cable attachment provides a tension tie between the handle 22 and rear wheel unit 24 to maintain the handle unit, back unit and rear upright in their extended position and against their respective stops.

To provide safety means for retaining the occupant in the stroller there is illustrated in Fig. 1 a belt 115 laced through suitable slotted openings at the sides of back panel 37 and having fastening means at each end thereof in the usual manner. Since this belt would cause confusion in the remaining illustrations, it is only shown in Fig. 1.

With reference to the drawings, and in particular Figs. 14 to 18 which diagrammatically illustrate the various stages of the folding or collapsing of the stroller, the operation of such folding will now be described. The handle 110 is grasped and the hook end 109 released from pin 108 after which the handle and cable 112 are stowed in bag 51. In the same sequence the loops 70 of the forward wheel units are manually rotated about the legs 71 until clear of the ledges 74 and then released to allow the ends of the legs to project below the lower face of blocks 59. Wheel forks 67 are then rotated inwardly to bring the openings in extensions 73 into alignment with the legs 71 locking the wheels and forks into the position shown by broken lines at A in Fig. 8, the rounded edges of the extensions camming legs upwardly to allow passage thereof. The results of above described sequence or stage of folding are illustrated in Fig. 15.

The upper edge of the back panel 37 and the forward edge of seat 25 are then grasped and drawn toward each other to bring these members into a common plane, the various stages of this operation being shown in Figs. 16, 17 and 18. During this operation the pins 39 will move along slots 38 due to the different relative lengths of arm rests 40 and seat unit 25 and the lower ends of tube 31 will move into the space 34 between the outer tubes 27 and seat panel 25 while the channel arm rests overlie a portion of the tubes 31. The decreasing angular relation of the forward uprights 31 and seat unit 25 moves the forward wheel unit toward the rear wheel supporting uprights to remove the effect of the telescopic tension members 78 and allow rotation of the transverse tube 56 relative to the uprights 31. Such rotation is caused by the effect of springs 60 urging the blocks 59 rearwardly and inwardly as limited by the slacking off of cables 75 and tension member 78. Such rotation of the tube 56 and blocks 59 bring the forks and wheels to an inward position as shown at B of Fig. 8 and as limited by the engagement of pins 61 with inner stop slots 62 when the closing or folding movement above described has been completed. In this position of parts the wheels and associated parts have been brought inwardly and in a plane parallel to the general flatwise plane of the folded seat and back as shown in Figs. 11, 12, 13 and 18. During this portion of the folding movement the tension unit 78 will telescope or collapse to some extent since its extended relation is no longer maintained or necessary, and, in addition, there will be a definite angular movement thereof relative to the forward wheel supporting unit.

The angular movement of the telescoping member 78 caused by the folding action of forward wheel unit will also cause a change in the angular relation of the member 78 to the rear wheel units about the pivot pin 106. Such relative angular change will shorten the distance between ball joints 103 and lever arms 101 which, through action of links 102, will move arms 101 and their associated levers 100 angularly about angle ends 99. The angular movement of levers 100 will cause a compound movement of the wheels 96 to bring the wheels into the plane of uprights 87 and inwardly toward the center of the stroller to the broken line position indicated at C in Fig. 4. The above described angular and inward movement of wheels 96, however, is only partly brought about by the folding of forward uprights 31 as above set forth, the completion of such movement being accomplished by the manual rotation of the rear wheel uprights about pins 86, as shown in Figs. 18 and 19. This movement not only completes the angular and inward movement of the wheels to a plane parallel to the general plane of the folded vehicle but also brings the rear wheel upright members into such folded plane as clearly shown in Figs. 11, 12, 13 and 19.

As the final steps in the folding of the vehicle the handle 22 is rotated about the pin 46 to bring same into overlying relation with the open side of the stroller and the flap 53 wrapped over the rear portion of seat panel 25 for engagement of snap fasteners 53' and 54. It will be seen that in this folded condition the wheels and associated mechanism and parts are concealed on one side by seat panel 25 and back panel 37 and on the opposite side by bag 51, while the side of the bag provided with the flap opening remains exposed for the stowage of any desired articles.

The opening of the stroller is accomplished by a reversed sequence of movements to bring same to its extended position by manual movement of the handle, rear uprights and angular manipulation of the seat and back units. During the relative movement of the seat and back the telescopic unit 78 will be extended to its full length to restrict the forward movement of the front wheel assemblies. Such restriction will cause an angular rotation of the transverse tube 56 relative to the forward uprights 31, which, due to the tensioning and pull of cables 75, will force blocks 59 to swing rearward and outward to their normal operating positions against the forces of springs 60. At the final position of these parts the angular terminals 77 of tubes 31 will strike blocks 59 and force stops 61 against the outer stop slots 62 to maintain the blocks in locked position. The manual unlocking of the forward wheel forks 67, by the actuation of loops 70 and legs 71, will then allow free castering effect of the forward wheels.

The hook end 109 of tension cable 112 may now be moved to engage pin 108 whereby the stops 49, 42 and 88 will be held in engagement with tubes 36 and pins 43 to maintain the extended or useful condition of the stroller, and prevent inadvertent collapse thereof. The effect of the tension member 78 is to retain a rearward force on the forward wheel unit and maintain same in its extended position. During the unfolding operation, or the angular movement of seat and back, the upper forward edges of the uprights 31 will engage the inner face of the channel arm rests 40 to cause a sliding movement of the rear end pins 39 of such arm rests downward along slots 38 and prevent excessive angular motion or collapse of the arm rests and uprights.

While only one specific embodiment of the present invention has been illustrated in the accompanying drawings and described herein, it is to be understood that various detailed modifications in structure or operation may be made without departing from the spirit and intended scope of the appended claims and as defined therein.

I claim:

1. A collapsible vehicle having a seat, back, forward and rear upright members each pivoted to another for folding movement, wheel supporting units on the forward and rear uprights, wheels rotatively mounted thereon, resilient means at the forward supporting units tending to urge the wheels angularly and inwardly upon folding movement of the vehicle, means at the rear supporting units to cause angular and inward movement of the wheels upon actuation thereof, and a connecting device betwwen the forward and rear units operable upon folding of the vehicle to actuate the said means at the rear unit and control the actuation of said resilient means at the forward unit for correlated folding movement thereof.

2. In combination with a vehicle of the type described comprising a seat, back, forward and rear upright supporting members, of wheel carrying units for said upright members having associated therewith means to effect angular and inward displacement of the wheels, a first tension member extending between and connecting the forward and rear uprights and a second tension member connecting the rear upright and the back unit to maintain the parts of the vehicle in extended operating relation and condition, the first tension member also serving to correlate and operate the wheel displacement means upon folding movement of the vehicle.

3. A vehicle of the type described comprising a seat unit, a back unit hinged thereto, forward wheel supporting uprights pivoted to and having a portion extending upwardly from the seat unit, arm rests joining the upper portion of said uprights to the back unit, rear wheel supporting uprights pivoted to the seat unit, stop means limiting the angular movement of the back and rear uprights relative to the seat unit, a collapsible tension member connecting the lower ends of forward and rear uprights, and disconnectable means connecting the back unit and rear uprights to maintain the parts in their stop limited position whereby the vehicle is in its extended useful condition.

4. A vehicle of the type described comprising a seat unit, a back unit pivoted thereto, forward supporting uprights pivoted intermediate their ends to the seat unit, arm rests hinged to the upper end of said uprights and the back unit, rear supporting uprights pivoted to the seat unit, stops for limiting angular movement of the back unit and rear uprights relative to the seat unit, wheel mounting assemblies on the forward and rear uprights, wheels rotatable thereon, means on said mounting assemblies for moving the wheel angularly and inwardly, a telescopic tension member connecting the mounting assemblies to control the movement of said assemblies and said means during folding of the vehicle, and a disconnectable tie between the back unit and rear wheel mounting assemblies to maintain the back unit and rear uprights against said stops and secure the tension member in its extended position to insure the correct attitude of wheels and frame for normal extended position and use of the vehicle.

5. A vehicle of the class described comprising a seat unit, a back unit hingedly connected thereto, forward wheel supports pivoted to the seat unit forwardly thereof and having a portion extending upwardly therefrom, an arm rest joining the upper portion of said supports to the back unit, rear wheel supports pivoted to the seat unit rearwardly thereof, a transverse member pivotally attached to forward supports, wheel mounting blocks carrying forward wheel units and swingably attached to said transverse member, springs normally urging the wheel mounting blocks to swing inwardly, cables attached to the supports and to the blocks to control the swinging movement thereof upon relative angular movement of the transverse member and the supports, rear wheel mounting means for the rear support, and means connecting the forward transverse member and the rear mounting means to control the relative movement of the forward and rear wheel units during folding movement of the vehicle.

6. A vehicle of the class described comprising a seat unit, a back unit hinged thereto, forward upright members pivoted to the seat unit and having a portion extending upwardly therefrom, arm rests joining the upper portion of said members to the back unit for pivotal movement therewith, rear upright members pivoted to the seat unit, wheel mounting units attached to the forward and rear upright members, wheels rotatively attached to said mounting units, means on the forward wheel mounting units to cause automatic retraction of the wheels angularly and inwardly upon folding of the vehicle, a telescopic unit connecting the forward mounting units with the rear mounting units, lever means for angularly and inwardly retracting the rear wheels, and links connecting the telescopic unit to the lever means for angular and inward retraction of the wheels upon folding movement of the vehicle.

7. A vehicle of the class described comprising a seat, a back hinged thereto, forward supporting uprights pivoted intermediate their ends to the seat, arm rests pivoted to the upper end of said uprights and the back, rear supporting uprights pivoted to the seat, a transverse member pivotally mounted on and between the lower end of the forward uprights, opposed support fittings swingably attached to said transverse member normally positioned outwardly of the attachment point, spring means urging the fittings to swing inwardly, stop means limiting the swinging movement of the fittings, wheel supporting forks pivoted to the outer end of said fittings for castering movement relative thereto, locking means associated with the fittings and fork to selectively lock the forks and wheels transversely of the vehicle, cables attached to the fittings and to the uprights to control the movement of said fittings and wheel fork assemblies upon relative rotation of the transverse member, and means controlling the rotation of such member connected thereto and to the rear supporting uprights.

8. A vehicle of the class described comprising a seat unit, a back unit hingedly connected thereto, forward upright members pivoted to the seat unit and having a portion extending upwardly therefrom, arm rests joining the upper portion of said members to the back unit for pivotal movement therewith, forward wheel mounting units pivotally attached to the lower portion of said upright members and having means adapted to move the wheels carried thereby angularly and inwardly upon folding movement of the vehicle; rear upright members pivotally secured to the seat unit and having a transverse member attached to the lower portions thereof, fittings pivoted to the transverse member, wheel supporting bell-cranks hinged thereto, levers pivoted on the transverse member for causing conjoint swinging motion of the fittings and bell-cranks to move the wheels angularly and inwardly into flatwise relation with the general plane of the rear upright members, and means connecting the forward and rear wheel mounting units and said levers whereby folding movement of the vehicle will cause angular and inward movement of the wheel units in correlated relation to each other.

9. A vehicle of the class described comprising a seat, a back hinged thereto, forward uprights pivoted intermediate their ends to the seat, arm rests pivoted to the upper end of said uprights and said back; a transverse member pivotally mounted on and between the lower ends of the forward uprights, opposed support fittings swingably attached to said transverse member and normally positioned outwardly of the attachment point, spring means urging the fittings to swing inwardly, stops limiting such swinging movement, wheel supporting forks pivoted to the outer of said fittings for castering movement relative thereto, locking means associated with the fittings and forks to selectively lock the forks and wheels transversely of the vehicle, cables attached to the fittings and to the forward uprights for controlling the swinging movement of said fittings and wheel forks upon rotation of the transverse member relative to the forward uprights, and stop means associated with the uprights and fittings limiting the rearward movement of the fittings relative to the uprights; rear supporting uprights pivoted to the seat and having a transverse member attached to the lower ends thereof, fittings pivoted to the transverse member, wheel supporting bell cranks hinged thereto, levers pivoted to the transverse member for causing conjoint swinging motion of the fittings and bell cranks to move the wheels angularly and inwardly into flatwise relation with the general plane of the rear uprights, and means connecting the forward and rear transverse members and said levers normally maintaining the forward and rear wheel units in their extended position and whereby folding movement of the seat, back and uprights will cause angular and inward movement of the forward and rear wheel units in correlated relation to each other.

10. A vehicle of the class described comprising a seat having fasteners fixed thereon, a back hinged thereto, a handle member hinged to the back, forward and rear supporting uprights hinged to the seat and having wheeled units mounted on the lower portions thereof, means to maintain parts in extended position, a panel on said handle comprising a storage bag which upon release of said means and folding of the vehicle will overlie and conceal the internal parts thereof, and a flap secured to said handle panel having fasteners cooperating with the seat fasteners to secure the vehicle in its collapsed condition.

TRYON S. LINDABURY.

REFERENCES CITED

The following references are of record in the file of this patent:

UNITED STATES PATENTS

| Number | Name | Date |
|---|---|---|
| 697,333 | Fanning | Apr. 8, 1902 |
| 1,022,094 | Kursten | Apr. 2, 1912 |
| 1,450,193 | Thomas | Apr. 3, 1923 |